(12) United States Patent
Bansal et al.

(10) Patent No.: US 12,732,514 B2
(45) Date of Patent: Sep. 8, 2026

(54) OFFLOADING PACKET INSPECTION TASKS TO A NETWORK INTERFACE CARD

(71) Applicant: MICROSOFT TECHNOLOGY LICENSING, LLC, Redmond, WA (US)

(72) Inventors: Gaurav Bansal, Bengaluru (IN); Arun Mappate, Kerala (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 189 days.

(21) Appl. No.: 18/528,647

(22) Filed: Dec. 4, 2023

(65) Prior Publication Data

US 2025/0184336 A1 Jun. 5, 2025

(51) Int. Cl.
*H04L 9/40* (2022.01)
*H04L 69/22* (2022.01)

(52) U.S. Cl.
CPC .......... *H04L 63/1416* (2013.01); *H04L 69/22* (2013.01)

(58) Field of Classification Search
CPC ............................ H04L 63/1416; H04L 69/22
See application file for complete search history.

(56) References Cited

U.S. PATENT DOCUMENTS 10,862,805 B1 * 12/2020 Dods ................... H04L 63/0254
11,133,999 B1 * 9/2021 Brosnan .................. H04L 63/14
11,411,919 B2 * 8/2022 Landriot ............. H04L 63/0263
11,792,117 B2 * 10/2023 Wang ...................... H04L 69/22
370/235

(Continued)

FOREIGN PATENT DOCUMENTS

EP 2262173 A1 12/2010
EP 2933955 B1 6/2017
EP 4221141 A1 8/2023

OTHER PUBLICATIONS

International Search Report and Written Opinion received for PCT Application No. PCT/US2024/055592, Feb. 21, 2025, 16 pages.

(Continued)

*Primary Examiner* — Nam T Tran
(74) *Attorney, Agent, or Firm* — Han Gim; Newport IP, LLC

(57) ABSTRACT

The techniques disclosed herein enable systems to offload deep packet inspection tasks to a network interface card. This is accomplished by configuring the network interface card with a configuration file. The configuration file identifies target protocols, target fields, a number of packets to analyze for each target protocol, as well as identification tables that enable the network interface card to identify packet attributes. Once configured, the network interface card can receive and analyze incoming network packets. Accordingly, the network interface card extracts and parses values represented by the network packet in accordance with the parameters of the configuration file. The extracted values are compared against the entries of the identification table to derive an attribute identifier which can be returned to a network protocol stack. Moreover, the configuration file can also provide support for standard and non-standard network protocols.

20 Claims, 7 Drawing Sheets

(56) References Cited

U.S. PATENT DOCUMENTS

| | | | | |
|---|---|---|---|---|
| 2012/0020217 | A1* | 1/2012 | Wakumoto .......... | H04L 63/1425 370/235 |
| 2013/0107892 | A1* | 5/2013 | Rubin .................... | H04L 69/22 370/474 |
| 2021/0185059 | A1* | 6/2021 | Achleitner .......... | H04L 63/1416 |
| 2023/0300063 | A1* | 9/2023 | Naeimi .................. | H04L 69/22 370/390 |

OTHER PUBLICATIONS

International Preliminary Report on Patentability (Chapter I) received for PCT Application No. PCT/US2024/055592, mailed on Jun. 18, 2026, 10 pages.

* cited by examiner

| APPLICATION NAME 312 : TYPE NAME 314 | TARGET STRING 316 | PACKET-COUNT 318 : OFFSET 320 | APPLICATION ID 322 | TYPE ID 324 |
| --- | --- | --- | --- | --- |
| Contoso : Audio | 0xaabbccdd<br>0x11223344 | 1:10<br>2:15 | 3<br>3 | 1 |
| Contoso : Text | 0xaabbccdd<br>0x55667788 | 1:10<br>2:15 | 3 | 2 |

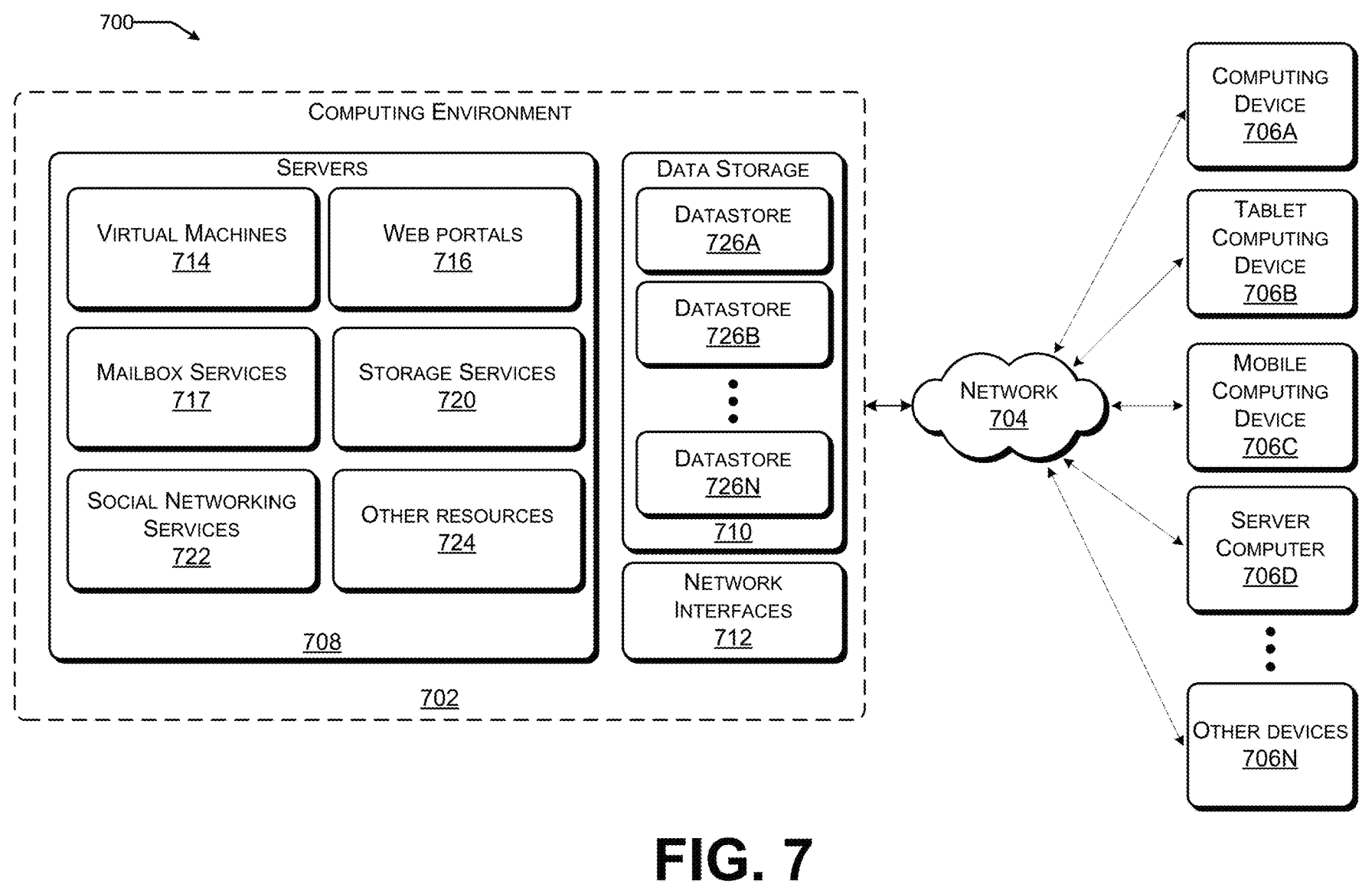

700

COMPUTING DEVICE 706A

TABLET COMPUTING DEVICE 706B

MOBILE COMPUTING DEVICE 706C

SERVER COMPUTER 706D

OTHER DEVICES 706N

NETWORK 704

COMPUTING ENVIRONMENT

SERVERS

VIRTUAL MACHINES 714

WEB PORTALS 716

MAILBOX SERVICES 717

STORAGE SERVICES 720

SOCIAL NETWORKING SERVICES 722

OTHER RESOURCES 724

708

702

DATA STORAGE

DATASTORE 726A

DATASTORE 726B

DATASTORE 726N

710

NETWORK INTERFACES 712

FIG. 7

OFFLOADING PACKET INSPECTION TASKS TO A NETWORK INTERFACE CARD

BACKGROUND

With the advent of increasingly advanced network technologies (e.g., 5G networks, 6G networks) there is a corresponding increase in the demand for enhanced user experiences such as increased bandwidth, reduced latency, and improved reliability. In addition, network operators such as telecommunications providers, internet service providers, and cloud computing providers can leverage advanced network technologies to gather insight into network activity to enable administrative operations. One approach for gathering such insight is inline analysis of network traffic using packet inspection techniques. In a specific example, a network operator extracts information from a packet header to identify applications that generate network traffic, protocols utilized by the network traffic, and so forth.

Accordingly, network operators can utilize the information gathered from network packet inspection to improve operations in various contexts. For instance, a network security program can utilize network packet inspection to detect malware signatures and mitigate potentially malicious network traffic. In another example, a network provider can utilize network packet inspection to ensure compliance with local and/or international regulations such as by detecting and blocking network traffic from specific applications. In still another example, a network provider can utilize packet inspection to automatically apply network policies to network traffic (e.g., priority applications, user permissions).

However, packet inspection tasks can involve parsing significant volumes of network packet data from standard protocol headers to non-standard protocols, and even payload data. Consequently, packet inspection techniques can be resource intensive potentially leading to significant processing delay thus negatively impacting performance. It is with respect to these and other considerations that the disclosure made herein is presented.

SUMMARY

The techniques discussed herein provide a system for offloading deep packet inspection (DPI) tasks for identifying attributes of network flow comprising a set of one or more network packets to a network interface card (NIC). In various examples, an attribute can be an application that generated the network flow, a source protocol, a traffic type such as audio, video, text, and so forth. Moreover, a network flow can comprise a specific set of network packets having the same five-tuple which contains a source address, a destination address, a source port, a destination port, and a transport layer protocol. A network interface card is a computer hardware component that enables a computing system to connect to a computer network. In the realm of computer networking, it is well known that some resource intensive tasks can be offloaded from a central computing unit (CPU) to a peripheral device such as a network interface card to free up the central computing unit for other tasks. However, existing systems continue to execute deep packet inspection tasks at the central computing unit leading to processing delays. This technical challenge can be exacerbated in high-speed networking contexts such as gigabit Ethernet and 10 gigabit Ethernet as resource demand increases with network speed.

Generally described, the techniques described herein involve configuring a network interface card in a distributed computing environment with a configuration file. In a specific example, the network interface card receives the configuration file during a startup phase (e.g., boot time). In an alternative example, the network interface card receives another configuration file during an operation phase (e.g., run time). That is, an existing configuration file is flushed from the network interface card and replaced with another configuration file to dynamically update the network interface card. In various examples, the configuration file identifies a target protocol and a target field for incoming network packets. For instance, the target protocol can include standard network protocols such as (TLS) Transport Layer Security (TLS), User Datagram Protocol (UDP), Quick UDP Internet Connections (QUIC), the Internet Protocol (IP), the Hypertext Transfer Protocol (HTTP), and the like. Accordingly, the target field can be a specific field of a header defined in accordance with standard network protocol. In a specific example, the target field can be the Server Name Indication (SNI) field of the Transport Layer Security protocol.

Moreover, the target protocol can be a non-standard network protocol that is not widely adopted or documented but may be nonetheless utilized by a particular application for certain technical benefits (e.g., security). As such, the configuration file may not identify a specific named field as such information may be undefined. Instead, the target field can be an offset within a particular packet (e.g., the tenth byte of the second packet of a given frame). In this way, the configuration file can set up the network interface card with support standard and non-standard protocols alike.

In general, a network packet comprises a header defining characteristics (e.g., administrative information) of the network packet such as the source of the network packet, a destination of the network packet, and so forth. As such, identifying attributes of a network packet can involve inspecting the payload as well as the header. For instance, network operator may wish to identify a source application that generated the network packet as well as a content type of the network packet (e.g., text data, image data, video data, audio data). Accordingly, the configuration file can enable the network interface card to inspect both the header and the payload of the network packet.

Once configured, the network interface card can proceed to receive incoming network traffic (i.e., one or several network packets). Accordingly, the network interface card can extract values from the various fields of the network packet in accordance with the target protocol and target field defined by the configuration file. In the context of the present disclosure, a value is any data present at a specific location within a network packet. For instance, the source address field of an Internet Protocol (IP) packet header represents a specific value. In another example, the tenth through fifteenth bytes of a non-standard network packet likewise represent another specific value.

To identify an attribute of the network flow, the network interface card can subsequently match the extracted value against an entry of an identification table defined by the configuration file. In a specific example, the network interface card is configured to identify an application that generated the network packet. Accordingly, the network interface card extracts the source domain name (e.g., contoso.com) from the network packet. The domain name is then matched against a corresponding entry of the identification table to derive an identification of the attribute (e.g., an identification number, an application name). The network interface card can subsequently return the identification of the attribute to a network stack and/or other software for processing network packets (e.g., user space firmware) executing at the central computing unit. In various examples, the network stack can execute an action on the network flow based on the identified attribute such as applying a network policy. For instance, network flows originating from certain applications can be identified and blocked. Conversely, the network interface card can be configured to execute the action on the network flow.

By offloading deep packet inspection tasks to the network interface card, the present techniques can conserve computing cycles for a central computing unit executing a suite of network protocols for processing network traffic (a network stack). As network performance (e.g., speed, bandwidth) continues to increase with advancements in networking technology, deep packet inspection tasks can introduce unacceptable latency and strain on available computing resources. As such, the resource conservation realized by offloading deep packet inspection tasks to the network interface device can be magnified in high-speed networking contexts.

In another example of the technical benefit of the present disclosure, the present system can improve the efficiency of deep packet inspection operations themselves by matching the value extracted from a network packet against an entry of an identification table to derive an identification number. In a specific example, the network interface card is tasked with identifying an application that generated a given network packet. Accordingly, the configuration file causes the network interface card to extract the domain name from the network packet. In various examples, a domain name can be up to 255 characters in length (i.e., 255 bytes). Consequently, attempting to return a long domain name may overwhelm mechanisms for transmitting data between the network interface card and the central computing unit such as a memory buffer (e.g., mbuf).

In contrast, a network interface card utilizing the present techniques can be configured with an application identification table. Accordingly, the network interface card matches the extracted domain name against a corresponding entry of the application identification table to derive an application identification number (e.g., 01). In various examples, the application identification may be configured as a short length value (e.g., an unsigned 16-bit integer). In this way, the present system can compress the volume of data that needs to be transmitted, thereby introducing improved memory efficiency. Moreover, as will be discussed below, multiple domain names can match to the same application identification number further compressing the volume of transmitted data.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 7 is a diagram illustrating a distributed computing environment capable of implementing aspects of the techniques and technologies presented herein.

DETAILED DESCRIPTION

The techniques described herein enable a system to offload deep packet inspection (DPI) tasks for identifying attributes of a network flow comprising a set of one or more network packets to a network interface card (NIC). As mentioned above, deep packet inspection can be a resource and time intensive process often introducing significant processing delay thereby degrading network performance and ultimately the user experience. Furthermore, such processing delays can be further worsened in high-speed networking contexts wherein the volume of processing increases dramatically with bandwidth leading to a further degraded user experience.

To address this technical challenge, the present system offloads the execution of deep packet inspection tasks to a network interface card from a central computing unit (CPU) thereby conserving computing resources. In this way, the disclosed techniques improve the efficiency of distributed computing environments such as datacenters. Moreover, the techniques discussed herein enable the network interface card to reduce the memory usage when transmitting data between the network interface card and the network stack at a central processing unit when performing deep packet inspection. As will be elaborated upon below, memory intensive operations such as processing long strings of data can be compressed using an identification table that is defined by a configuration file.

Figure 1:
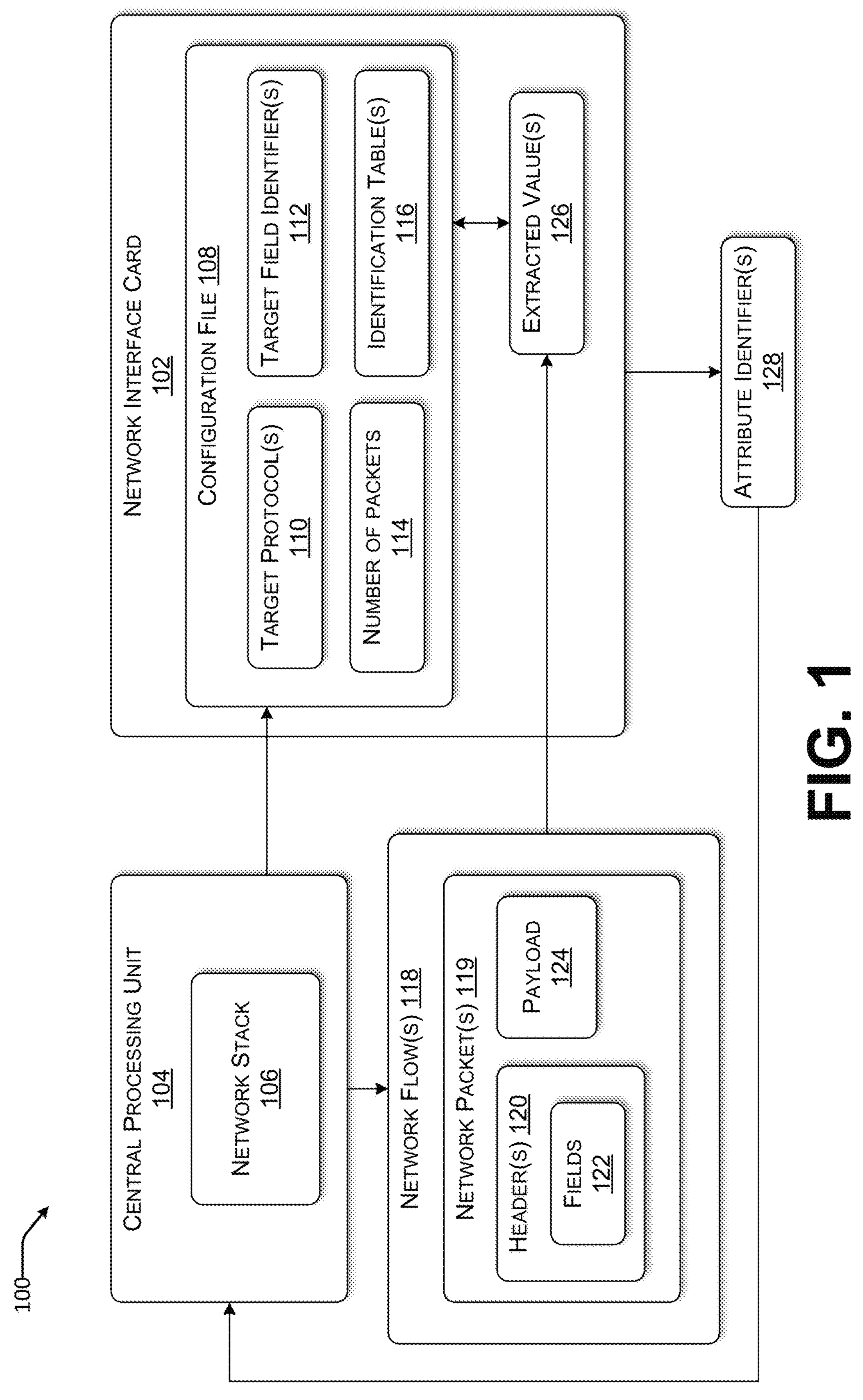
FIG. 1 is a block diagram of a system for offloading identification of attributes of a network flow to a network interface card configured to process network traffic in a distributed computing environment.

FIG. 1 illustrates a system 100 for offloading deep packet inspection tasks to a network interface card 102 from a central processing unit 104. As shown, the central processing unit 104 can be configured to execute a network stack 106 comprising an implementation of a computer networking protocol suite. The network stack 106 can include individual protocols for specialized purposes corresponding to various layers of the Open Systems Interconnection (OSI) model. In a specific example, the network stack 106 comprises the Ethernet protocol at the data link layer, the Internet Protocol (IP) at the network layer, the Transmission Control Protocol (TCP) in conjunction with the Transport Layer Security (TLS) also known as Transport Layer Security (TLS) at the transport layer, and Hypertext Transfer Protocol (HTTP) at the application layer. As such, by offloading deep packet inspection tasks from the central processing unit 104, the system 100 reduces resource strain thereby preventing performance degradation of the network stack 106.

To enable the network interface card 102 to perform deep packet inspection, the network interface card 102 can receive a configuration file 108 defining a target protocol 110 and a target field identifier 112 corresponding to the target protocol 110. In a specific example, the target protocol 110 is the Transport Layer Security/Transport Layer Security protocol and the target field identifier 112 is the Server Name Indication (SNI) field. It should be understood that the configuration file 108 can identify multiple target protocols 110 and target field identifiers 112.

Furthermore, the configuration file 108 can define a number of packets 114 to be analyzed for each of the target protocols 110. In a specific example, the configuration file 108 identifies the Hypertext Transfer Protocol and Transport Layer Security protocol as the target protocols 110 with a "domain-name" target field identifier 112. Because the information may be determined from a single packet, the configuration file 108 defines the number of packets 114 for the target protocol 110 as "four." However, as will be discussed below, some attributes of network traffic may require analysis of multiple network packets. In other examples, the number of packets 114 can be the maximum number of packets to be analyzed by the network interface card 102 to determine a certain attribute. That is, if the attribute cannot be determined within the number of packets 114, the network interface card 102 concedes the task and proceeds to a subsequent task, Accordingly, the network interface card 102 can be configured to generate a default output in such situations. In a specific example, when attempting to identify the domain name of a network packet utilizing the Transport Layer Security protocol the number of packets 114 is defined as "4" as the domain name is present in the fourth packet and represented as a host-name/server name indication.

The configuration file 108 can additionally define a set of identification tables 116 which enable the network interface card 102 to determine identifications of attributes based on data extracted from a network traffic. For instance, the configuration file 108 can include a first identification table 116 for identifying applications using standard network protocols and a second identification table for identifying applications using non-standard network protocols. In various examples, the configuration file 108 can be generated by the central processing unit 104 and transmitted to the network interface card 102 during a startup phase (e.g., at boot time). As such, the configuration file 108 enables the network interface card 102 to perform deep packet inspection tasks at a subsequent time.

Accordingly, the network interface card 102 can receive a network flow 118 comprising a set of one or more network packets 119. For instance, the network flow 118 can be a five-tuple containing five network packets 119 in accordance with the Transmission Control Protocol. An individual network packet 119 includes a header 120 comprising various fields 122 defining characteristics of the network packet 119 such as a source IP address, a destination IP address, a source TCP port, and so forth. In addition, the network packet 119 can include a payload 124 comprising content data. That is, where the header 120 defines administrative information for processing the network packet 119, the payload 124 defines the information that is being transmitted by the network packet 119. In a specific example, the network packet 119 is initially received by the network stack 106 at the central processing unit 104 and transferred to the network interface card 102 for deep packet inspection. In an alternative example, the network packet 119 directly received by the network interface card 102 from an external network. Accordingly, the network packet 119 is inspected by the network interface card 102 and then transmitted for processing by the network stack 106 at the central processing unit 104.

In accordance with the target field identifier 112 of the configuration file 108, the network interface card 102 can retrieve an extracted value 126 from the network packet 119. In various examples, the extracted value 126 can be retrieved from the header 120 and/or the payload 124. In a specific example, the extracted value 126 is the value represented by a specific field 122 of the header 120. In an alternative example, the extracted value 126 is a specific segment of the content data defined by the payload 124. In still another example, the extracted value 126 includes values from both the header 120 and the payload 124.

The network interface card 102 can proceed to match the extracted value 126 against the identification table 116. As will be discussed further below, the identification table 116 includes a plurality of entries defining candidate values for the target field identifier 112. Accordingly, by matching the extracted value 126 to an entry of the identification table 116, the network interface card 102 can generate an attribute identifier 128 specifying an attribute of the network flow 118 such as a source application, traffic type, or any combination of attributes. In various examples, the network interface card 102 can be configured with support for regular expressions (regex) to enable different methods of matching the extracted value 126 against the identification table 116 such as "starts with", "ends with", "contains", and so forth. Alternatively, the network interface card 102 can be configured with support for only one method of matching the extracted value 126 (e.g., "ends with").

In a specific example, the extracted value 126 is a domain name where the identification table 116 includes entries relating various domain names to application identifiers. By matching the domain name extracted value 126 to the domain name of an entry of the identification table 116, the network interface card 102 can generate an attribute identifier 128 identifying an application that generated the network flow 118 containing the network packet 119. The attribute identifier 128 can then be returned to the network stack 106 at the central processing unit 104 to control processing of the network packet 119. That is, the system 100 can execute certain actions on the network flow 118 and/or network packets 119 based on the attribute identifier 128. For instance, the network stack 106 may include certain network policies pertaining to specific applications (e.g., a firewall). As such, a network packet 119 originating from the application as determined by the network interface card 102 can be processed by the network stack 106 in accordance with the network policy (e.g., blocked). Moreover, the action can be executed by the network stack 106 and/or the network interface card 102.

Figure 2:
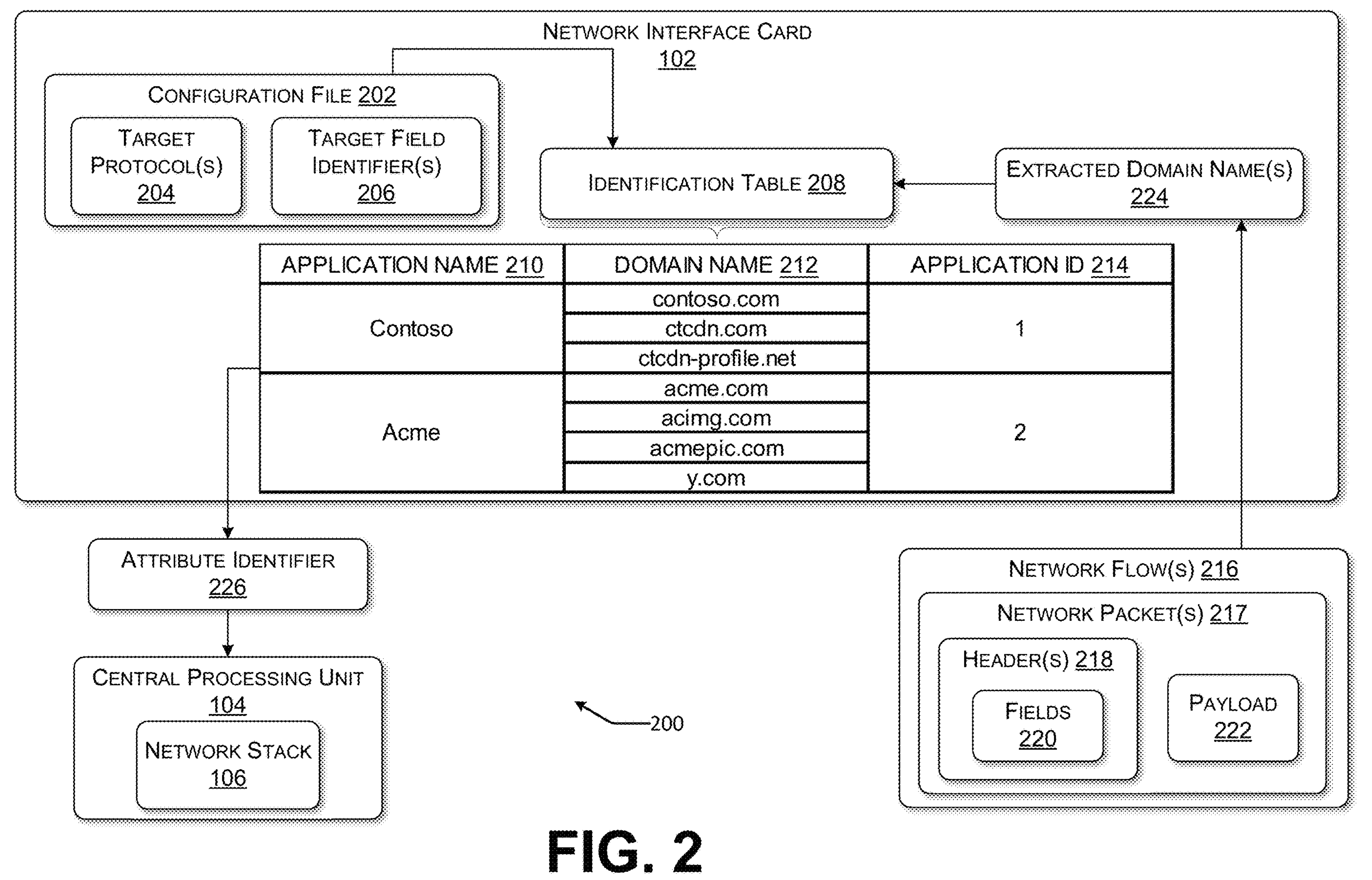
FIG. 2 illustrates an example environment in which a network interface card is configured to identify an application from a domain name extracted from a network flow.

Turning now to FIG. 2, aspects of an environment 200 in which a network interface card 102 is configured to identify an application from a set of network packets within a network flow are shown and described. Similar to the examples discussed above, a network interface card 102 can be set up to perform specific deep packet inspection tasks via a configuration file 202 defining a target protocol 204 and an associated target field identifier 206. Moreover, the configuration file 202 can equip the network interface card 102 with an identification table 208 corresponding to the target field identifier 206. Furthermore, while the configuration file 108 discussed above specifies a number of packets 114 to inspect, it should be understood that such a definition can be optional in some scenarios. In a specific example, the target protocol 204 is HTTP and the target field identifier 206 is the "host-name", the configuration file 202 can forgo specifying a number of packets as the "host-name" value is always present in the fourth network packet of an HTTP flow.

In the present example, the identification table 208 enables the network interface card 102 to identify an application name 210 from a domain name 212 where the target field identifier 206 is the domain name 212. That is, the network interface card 102 translates a domain name 212 into an application name 210 using the identification table 208. Moreover, the domain name 212 can also be translated into an application ID 214 comprising a numerical value that corresponds to an application name 210. For instance, the "Contoso" application name 210 has a corresponding application ID 214 of "1". In a specific example, the application ID 214 is configured as an unsigned 16-bit integer. As such, a 16-bit integer application ID 214 is capable of representing 65,536 unique application IDs. In contrast to a domain name, which can be up to 255 bytes in size, a 16-bit integer is only two bytes in size thereby significantly reducing the volume of data to represent the same information thereby improving the memory efficiency of the system.

In addition, a given application name 210 may be associated with multiple domain names 212. Stated alternatively, multiple domain names 212 can belong to the same application with various domain names 212 serving specific purposes. For example, the "Acme" application name 210 can correspond to a general "acme.com" domain name 212 as well as an "acmepic.com" domain name 212 for image hosting in the "Acme" application. As such, a plurality of different entries for the domain name 212 can result in the same application name 210 and/or application ID 214.

As described above, the network interface card 102 can receive the configuration file 108 during an initial startup phase (e.g., boot time). Alternatively, the network interface card 102 can receive the configuration file 108 during an operation phase (e.g., runtime) to enable dynamic reconfiguration of the network interface card 102. The network interface card 102 can then receive a network flow 216 comprising a set of network packets 217. As shown, an individual network packet 217 of the network flow 216 can include a header 218 comprising a set of fields 220 defining various characteristics of the network flow 216 as well as a payload 222 encoding content data transmitted by the network packet 217 such as text data, image data, audio data, and so forth.

Accordingly, the network interface card 102 can retrieve an extracted domain name 224 from the network packet 217 in accordance with the target field identifier 206 of the configuration file 202. As with the extracted value 126 discussed above, the extracted domain name 224 can be derived from the header 218 and/or the payload 222 per the target field identifier 206. In a specific example, the target field identifier 206 specifies the Server Name Indication where the target protocol 204 is the Transport Layer Security protocol. Consequently, the extracted domain name 224 is retrieved from the fields 220 of the header 218 and not the payload 222. Conversely, for a non-standard target protocol 204 which may be narrowly adopted and relatively undocumented, the extracted domain name 224 may be derived from both the header 218 and the payload 222.

Alternatively, the target field identifier 206 may generally refer to a "domain name" in which the network interface card 102 retrieves all information from the network packet 217 pertaining to a domain name. For instance, the "host name" field of the Hypertext Transfer Protocol and the "server name indication" field of the Transport Layer Security protocol may all relate to a "domain name." As such, a network packet 217 can contain a plurality of headers 218 corresponding to each of these protocols. That is, the network packet 217 can include an HTTP header, an TLS header as part of a TCP header, and so forth. In accordance with the "domain name" target field identifier 206, the network interface card 102 can extract the values represented by each of these fields from each of the corresponding headers 218 of the network packet 217 to form the extracted domain name 224.

The network interface card 102 can subsequently match the extracted domain name 224 against a domain name entry 212 of the identification table 208. In a specific example, the extracted domain name 224 is "ctcdn.com" which matches a domain name entry 212 corresponding to the "Contoso" application name 210 and the "1" application ID 214. Accordingly, the network interface card 102 returns the application name 210 and/or the application ID 214 as an attribute identifier 226 to the network stack 106 at the central processing unit 104. In an alternative example, the attribute identifier 226 comprises the application ID 214 and not the application name 210. That is, the attribute identifier 226 is a single numerical value as opposed to a string of text. As such, the network stack 106 is likewise configured with an identification table 208 in which the attribute identifier 226 is matched to determine an application name 210. In this way, the network interface card 102, via the identification table 208, can reduce the volume of data that is transmitted between the network interface card 102 and the central processing unit 104 thereby conserving computing resources and improving efficiency.

Figure 3:
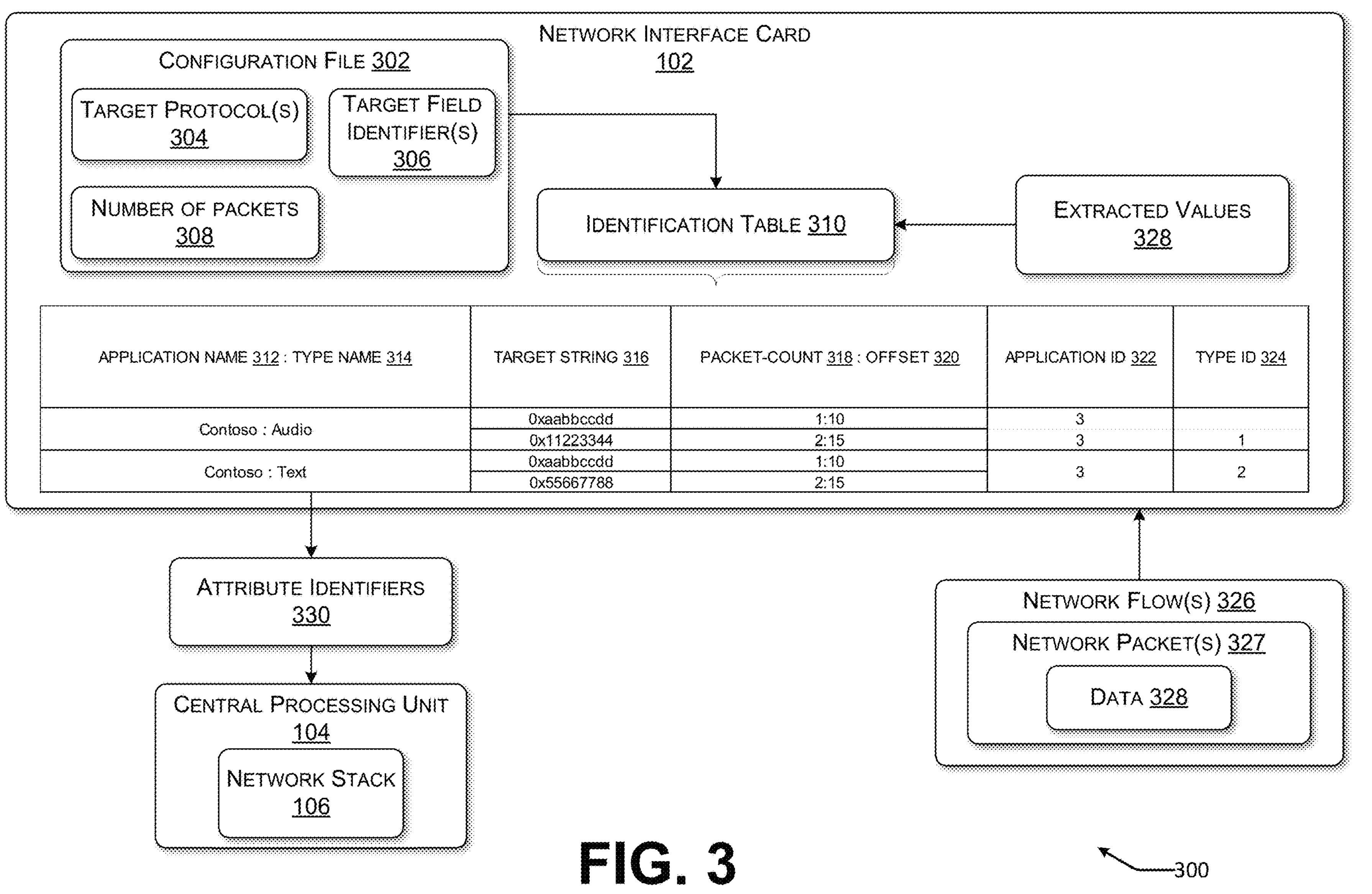
FIG. 3 illustrates an example environment in which a network interface card is configured to identify a first attribute and a second attribute of a network flow.

Proceeding to FIG. 3, an environment 300 in which a network interface card 102 is configured to identify a plurality attributes of a network flow comprising a set of one or more network packets is shown and described. As in the examples described above, the network interface card 102 can receive a configuration file 302 defining a target protocol 304 and a target field identifier 306. In addition, the configuration file 302 can define a number of packets 308 to analyze for the target protocol 304.

While the example discussed above with respect to FIG. 2 related to a standard network protocol (e.g., IP, TCP, TLS, HTTP), the example of FIG. 3 relates to a non-standard network protocol which can be any network protocol that is not widely adopted, supported, and/or documented. For instance, an application may utilize standard protocols such as IP, TLS, and HTTP. However, the application may use an additional, non-standard protocol to introduce additional functionality beyond transmitting and presenting information. For instance, a messaging application may utilize a non-standard protocol to encrypt content data. Of course, network packets that are formatted in accordance with a non-standard protocol cannot be parsed using a standard protocol. As such, the configuration file 302 must enable the network interface card 102 to parse non-standard network protocols.

Accordingly, the configuration file 302 can equip the network interface card 102 with an identification table 310 that enables the network interface card 102 to parse a non-standard network protocol and identify multiple attributes of one or more network packets. Specifically, the identification table 310 enables the network interface card 102 to identify an application name 312 and a type name 314 (e.g., audio, text, image). For instance, one entry of the identification table 310 comprises a "Contoso" application name 312 and an "Audio" type name 314. In this way, the identification table 310 enables the network interface card 102 to differentiate between different types of network traffic based on the content being transmitted.

In addition, the identification table 310 includes a set of target strings 316 associated with a packet count 318 and offset 320 defined by the target field identifiers 306. As mentioned above, in situations involving non-standard network protocols, the network interface card 102 may parse network traffic as a continuous string of characters (e.g., hexadecimal) as opposed to a delineated set of fields defined by a specification (e.g., TCP/IP). As such, an individual target field identifier 306, in the context of a non-standard protocol, can be defined in terms of a packet count 318 and an offset 320. In various examples, by including an identification table 310 that defines a target string 316 and a packet count 318, the configuration file 302 may omit the target field identifier 306 and/or the number of packets 308. That is, a sufficiently well-defined identification table 310 can enable a simplification of the configuration file 302 to reduce redundant information and/or reduce the volume of data transmitted between a central processing unit and the network interface card 102.

In various examples, the packet count 318 is the position of an individual network packet within a frame encapsulating multiple network packets. For instance, a packet count 318 of "01" can refer to the first packet in the frame in a one-based indexing format. Likewise, an offset 320 is the position of a given value within a network packet. For example, an offset 320 of "10" can refer to a value beginning at the tenth byte of the network packet. As such, the length of the value can be bounded by an associated target string 316. In a specific example, consider a target string 316 "0xaabbccdd" that is four bytes in length. In conjunction with a packet count 318 and an offset 320, the network interface card 102 can extract a value that is four bytes in length beginning at the tenth byte of the first network packet. Furthermore, the identification table 310 can include entries for an application ID 322 and type ID 324 corresponding to the application name 312 and type name 314 wherein a numerical value represents a full textual identifier.

Once configured with the identification table 310, the network interface card 102 can subsequently receive a network flow 326 comprising a set of network packets 327. As mentioned above, in a non-standard network protocol context, an individual network packet 327 may appear as an unstructured series of data 328 (e.g., a string of hexadecimal characters). In accordance with the identification table 310, the network interface card 102 can proceed to retrieve a set of extracted values from the network packets 327. As mentioned, the identification table 310 enables the network interface card 102 to identify multiple attributes of incoming network traffic such as an application name 312 and a type name 314. In various examples, performing this analysis may involve inspecting multiple network packets 326 as defined by the number of packets 308. For instance, a first target string 316 (e.g., "0xaabbccdd") located by a first packet count 318 and a first offset 320 can correspond to the application name 312. Meanwhile, a second target string 316 (e.g., "0x11223344") located by a second packet count 318 and a second offset 320 can correspond to the type name 314.

As such, the network interface card 102 retrieves a set of extracted values 328 from the network packets 328 in accordance with the packet counts 318 and offsets 320 defined by the identification table 310. Similar to the above examples, the extracted values 328 are compared against the entries of the identification able 310. In a specific example, the extracted values 328 comprise a first string and a second string which are compared against the target strings 316 of the identification table 310 wherein the first string relates to the application name 312 and the second string relates to the type name 314. Moreover, the first string relating to the application name 312 can be extracted from a first network packet 327 while the second string relating to the type name 314 can be extracted from a second network packet 327.

In the event both the first string and the second string of the extracted values 328 match a pair of target strings 316 (e.g., "0xaabbccdd" and "0x11223344") the network interface card 102 can generate a pair of attribute identifiers 330 corresponding to the matching entries of the identification table 310. For example, the attribute identifiers 330 can include a first attribute identifier relating to an application name 312 and/or an application ID 322. Likewise, a second attribute identifier of the attribute identifiers 330 can relate to the type name 314 and/or type ID 324 associated with the identified application. Accordingly, the attribute identifiers 330 can be returned to a central processing unit 104 executing a network stack 106. Moreover, the attribute identifiers 330 can be the full application name 312 and type name 314. Alternatively, the attribute identifiers 330 can be the corresponding application ID 322 and type ID 324 derived from matching the extracted values 328 against the target strings 316. In this way, the identification table 310 can enable the network interface card 102 to reduce the volume of data that is transmitted to the network stack 106 thereby improving efficiency.

Figure 4:
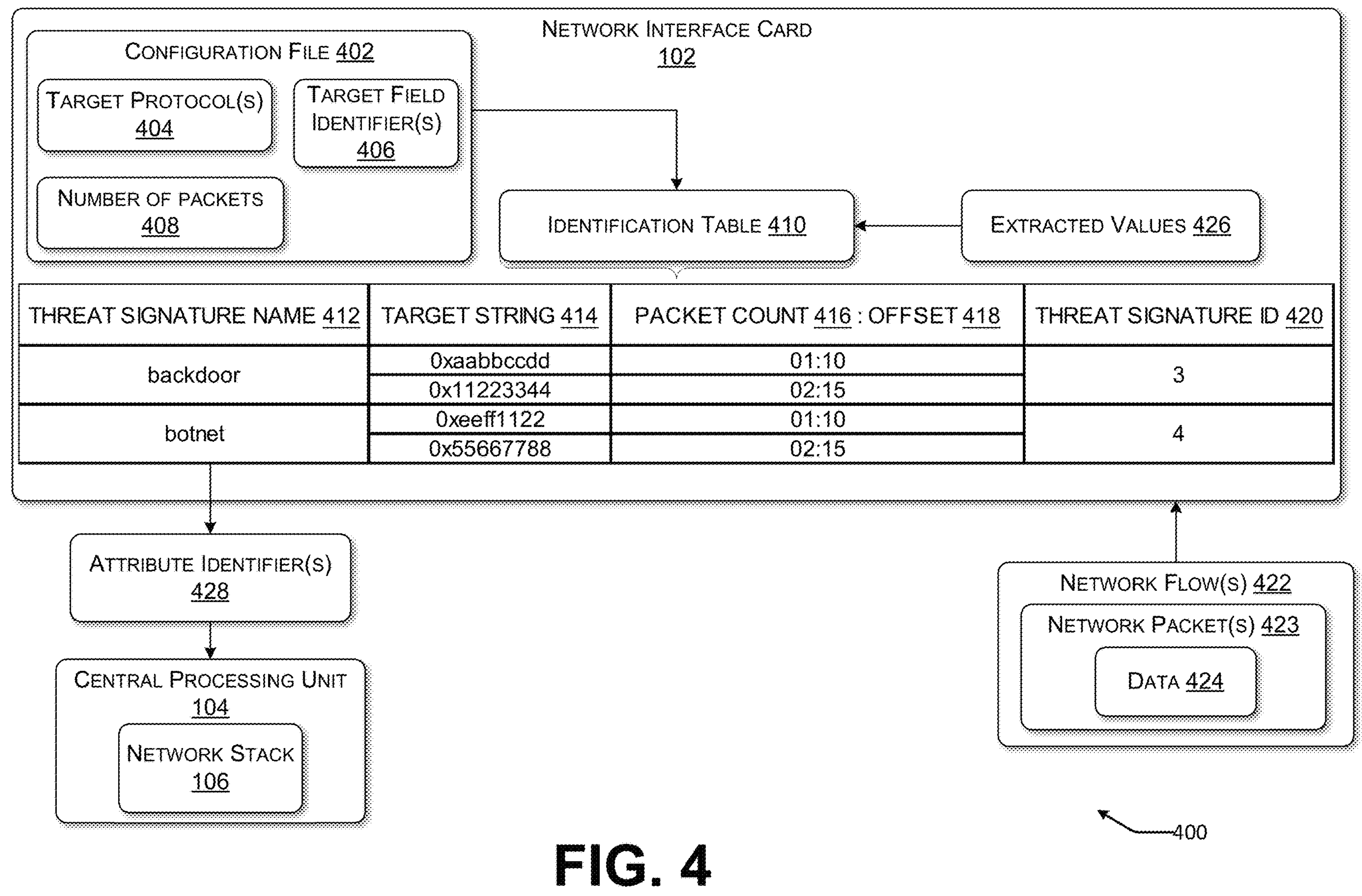
FIG. 4 illustrates an example environment in which a network interface card is configured to identify a malware signature from an extracted value of a network packet of a network flow.

Turning now to FIG. 4, aspects of another example environment 400 in which a network interface card 102 is configured to detect malicious network traffic are shown and described. As in the above examples, the network interface card 102 can receive a configuration file 402 defining a target protocol 404, a target field identifier 406, and a number of packets 408 to inspect for the target protocol 404. Accordingly, the network interface card 102 is further equipped by the configuration file 402 with an identification able 410 that enables the network interface card 102 to identify a malware threat signature from incoming network traffic (e.g., one or more network packets).

Accordingly, the identification table 410 can include entries for a threat signature name 412 such as a "backdoor" threat signature and a "botnet" threat signature. In various examples, a backdoor is any program that enables an attacker to gain unauthorized remote access to a computing system. Similarly, a botnet is a network of malware-infected computers (i.e., "bots") that an attacker controls. Accordingly, the attacker can utilize the infected computers to carry out a coordinated action such as distribute denial-of-service attack. Such security incidents can carry characteristic indicators that enable various systems to detect and subsequently mitigate malicious software, often referred to as a threat signature.

To enable the network interface card 102 to detect these threat signatures, the identification table 410 can include entries for target strings 414 derived from the target field identifier that correspond to certain threat signatures. Moreover, the identification table 410 can include a packet count 416 and associated offset 418 identifying a location within a network packet to search for the target string 414. Moreover, said entries can correspond to a threat signature ID 420 wherein a numerical value is used to represent an associated threat signature name 412.

Ater being configured with the identification table 410, the network interface card 102 can receive a network packet 422 for inspection. In various examples, the network packets 422 may utilize a non-standard network protocol and consequently an individual packet can appear as a series of unformatted data 424. This can be a result of an attacker attempting to encrypt or otherwise obfuscate the malicious nature of incoming network packets 422. Alternatively, the network packets 422 may utilize a standard network protocol in which case various headers and header fields can be specified by the configuration file 402 and the identification table 410 in place of the target strings 414. Irrespective of an attacker's choice of protocol, the configuration file 402 can specify a plurality of target protocols 404 to enable the network interface card 102 to handle any potential format of the network packets 422.

Accordingly, the network interface card 102 can retrieve a set of extracted values 426 in accordance with the packet counts 416 and offsets 418. The extracted values 426 are then compared against the entries of the identification table 410 similar to the examples discussed above. A match at the identification table 410 enables the network interface card 102 to derive an attribute identifier 428 comprising the threat signature ID 420 and/or the threat signature name 412 which is returned to a network stack 106 executing at a central processing unit 104. As in the examples discussed above, by utilizing a numerical value threat signature ID 420 in place of a full threat signature name 412 enables the network interface card 102 to reduce the volume of data being transmitted when returning the attribute identifier 428. However, it should be understood that the network interface 102 may be optionally configured to return a full threat signature name 412 instead of or in addition to the threat signature ID 420. In response to receiving the attribute identifier 428, the network stack 106 can process the network packets 422 in accordance with a predetermined mitigation strategy based on the type of malicious activity identified by the threat signature ID 420 and/or the threat signature name 412. In a specific example, the network stack 106 instructs the network interface card 102 to drop malicious network packets 422. In this way, the identification table 410 enables the network interface card 102 to enhance the security of distributed computing systems and networks.

Figure 5:
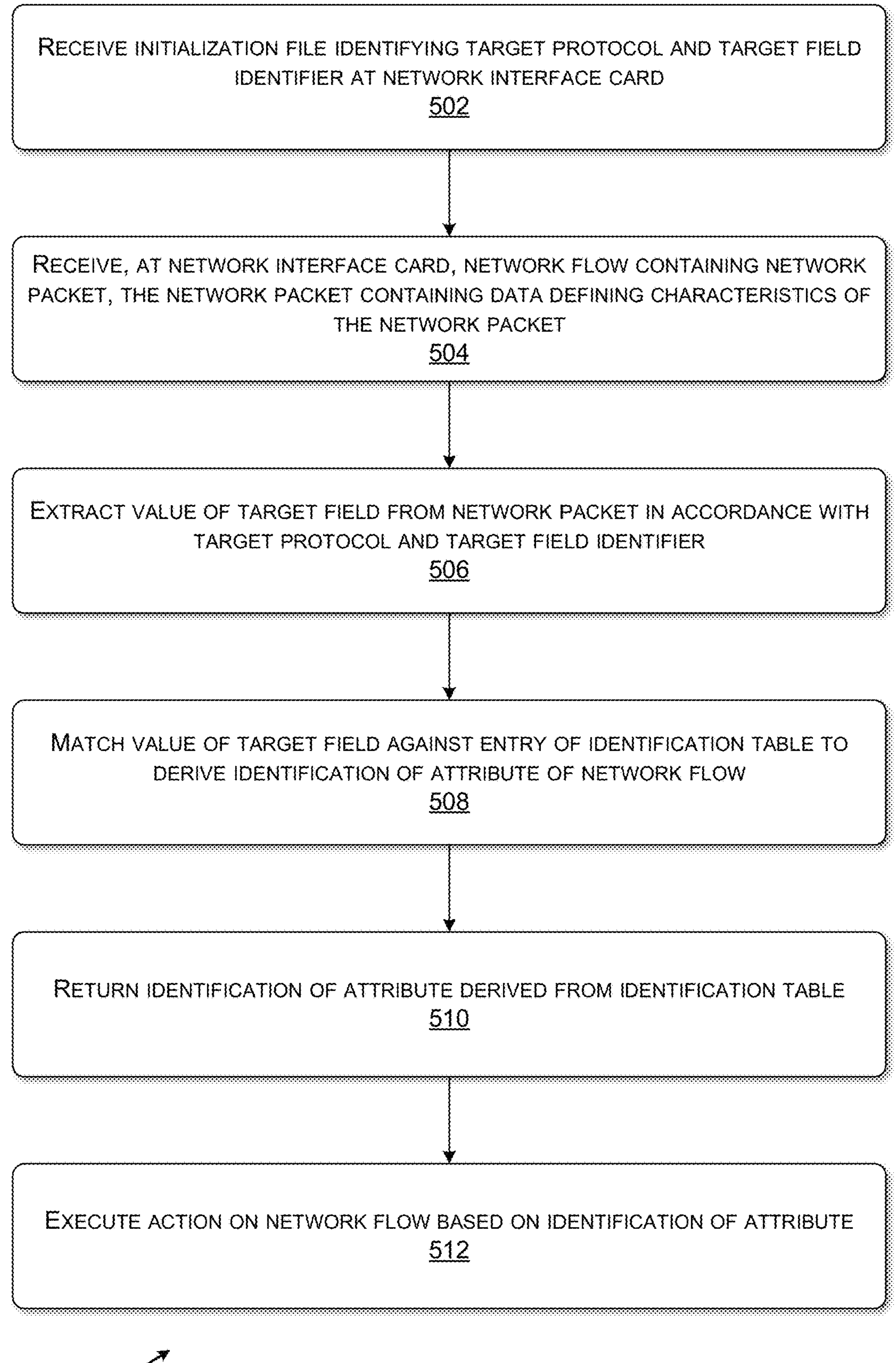
FIG. 5 is a flow diagram showing aspects of a routine for offloading identification of attributes of a network flow to a network interface card configured to process network traffic in a distributed computing environment.

Turning now to FIG. 5, aspects of a process 500 for offloading identification of attributes of a network flow to a network interface card are shown and described. With respect to FIG. 5, the process 500 begins at operation 502 where the network interface card receives a configuration file identifying a target protocol and a target field identifier. For example, the target protocol can be the Transport Layer Security protocol where the target field identifier is the server name indication field. Moreover, the configuration file can identify a plurality of target protocols and accordingly a plurality of target field identifiers as well as standard and/or non-standard protocols.

Then, at operation 504, the network interface card receives a network packet, the network packet containing data defining characteristics of the network packet. In a specific example, the data defining the characteristics of the network packet is a Transmission Control Protocol (TCP) header comprising a delineated set of fields encoding administrative information of the network packet such as source, destination, and the like. Moreover, the data can also include the payload of the network packet where the payload comprises content data that is transmitted by the network packet such as text, audio, and image data.

Next, at operation 506, the network interface card extracts a value of the target field from the data of the network packet in accordance with the target protocol and the identifier of the target field identified by the configuration file. In a specific example, the value of the target field is a specific value represented by one of the delineated fields of a standard network protocol header such as the source address of an Internet Protocol header. Conversely, the value of the target field can be a subset of an unformatted set of data (e.g., a hexadecimal string). Moreover, the value of the target field can be extracted from one or both of a header and a payload of the network packet.

Proceeding to operation 508, the network interface card matches the value of the target field to an entry of an identification table defined by the configuration file to derive an identification of the attribute of the network flow. In a specific example, the value of the target field is a domain name that is matched to a domain entry of the identification table to derive an identifier for an application that generated the network flow.

Then, at operation 510, the network interface card returns the identification of the attribute derived from the entry of the identification table. In various examples, the identification of the attribute is returned to a network stack at a central computing unit to determine how to process the network packet. For instance, certain identified attributes of the network packet can be utilized to determine a network policy to apply to the network packet.

Finally, at operation 512, the system executes an action on the network flow based on the identification of the attribute. As mentioned above, the action can include applying a network policy to network flow originating from a certain application. Other actions can include rerouting the network flow, filtering the network flow, modifying data within the network packets of the network flow, and so forth. Moreover, the action can be executed by a network stack (e.g., at a central processing unit) and/or the network interface card.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein which can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
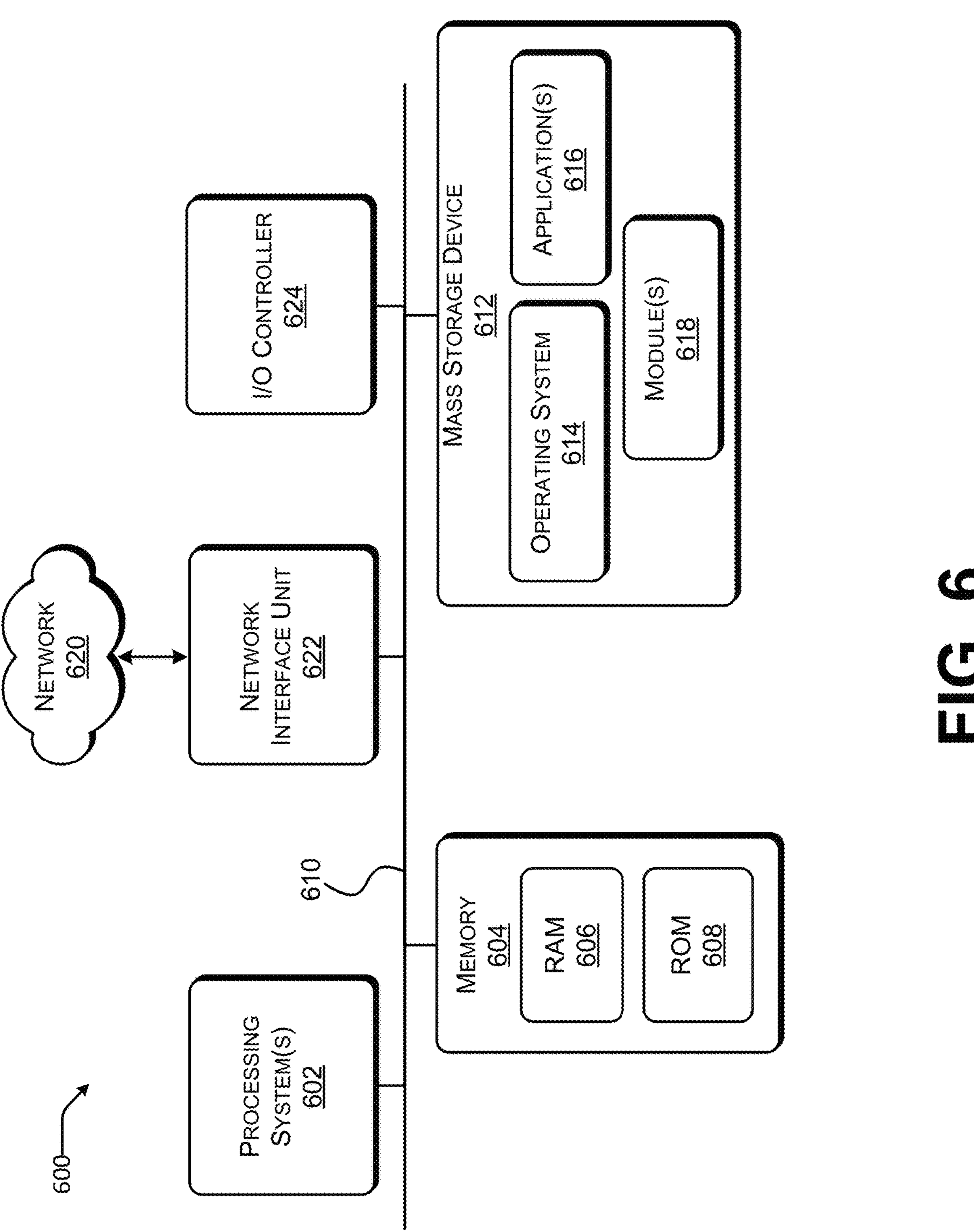
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706"), such as the user device 102, can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for offloading identification of an attribute of a network flow to a network interface card configured to process network traffic in a distributed computing environment, the method comprising: receiving, by the network interface card, a configuration file identifying a target protocol and an identifier of a target field of a network packet of the network flow wherein the configuration file configures the network interface card to identify the attribute of the network flow; receiving, by the network interface card, the network flow containing the network packet, the network packet containing data defining characteristics of the network flow; extracting, by the network interface card, a value of the target field from the data of the network packet in accordance with the target protocol and the identifier of the target field identified by the configuration file; matching, by the network interface card, the value of the target field to an entry of an identification table defined by the configuration file to derive an identification of the attribute of the network flow; returning, by the network interface card, the identification of the attribute derived from the entry of the identification table; and executing an action on the network flow based on the identification of the attribute.

Example Clause B, the method of Example Clause A, wherein: the identification of attributes comprises inspecting a plurality of network packets of the network flow; and the configuration file further identifies a number of network packets of the network flow to inspect for the target protocol.

Example Clause C, the method of Example Clause A or Example Clause B, wherein: the attribute is a first attribute; the target field is a first target field; and the network packet is a first network packet; the configuration file further identifies an identifier of a second target field of the network flow, the method further comprising: extracting, by the network interface card, a value of the second target field from a second network packet in accordance with the target protocol and the identifier of the second target field identified by the configuration file wherein the value of the first target field is extracted from the first network packet; matching the value of the first target field and the value of the second target field to the entry of the identification table to derive an identification of the first attribute and a second attribute of the network flow; and returning the identification of the first attribute and the second attribute derived from the entry of the identification table.

Example Clause D, the method of any one of Example Clause A through C, wherein: the value of the target field comprises a first volume of data; the identification of the attribute derived from matching the value of the target field to the entry of the identification table is a value comprising a second volume of data that is less than the first volume of data; and returning the value derived from matching the value of the target field to the entry of the identification table reduces a memory consumption associated with returning the identification of the attribute of the network flow.

Example Clause E, the method of any one of Example Clause A through D, wherein: the value of the target field is a domain name; the identification of the attribute is an application name; and matching the value of the target field to the entry of the identification table comprises matching the domain name to derive the application name.

Example Clause F, the method of any one of Example Clause A through D, wherein: the value of the target field is a hexadecimal pattern within a payload of the network packet; the identification of the attribute is a malicious signature; and matching the value of the target field to the entry of the identification table comprises matching the hexadecimal pattern within the payload to derive the malicious signature that corresponds to the hexadecimal pattern.

Example Clause G, the method of any one of Example Clause A through F, wherein matching the value of the target field to the entry of the identification table to derive the identification of the attribute of the network flow comprises matching the value of the target field to one of a plurality of entries associated with the identification of the attribute.

Example Clause H, a system for offloading identification of attributes of a network flow to a network interface card configured to process network traffic in a distributed computing environment, the system comprising: a processing system; and a computer-readable medium having encoded thereon computer-readable instructions that when executed by the processing system, cause the system to perform operations comprising: receiving, by the network interface card, a configuration file identifying a target protocol and an identifier of a target field of a network packet of the network flow wherein the configuration file configures the network interface card to identify the attributes of the network flow; receiving, by the network interface card, the network flow containing the network packet, the network packet containing data defining characteristics of the network flow; extracting, by the network interface card, a value of the target field from the data of the network packet in accordance with the target protocol and the identifier of the target field identified by the configuration file; matching the value of the target field to an entry of an identification table defined by the configuration file to derive an identification of the attribute of the network flow; and returning the identification of the attribute derived from the entry of the identification table.

Example Clause I, the system of Example Clause H, wherein: the identification of attributes comprises inspecting a plurality of network packets of the network flow; and the configuration file further identifies a number of network packets of the network flow to inspect for the target protocol.

Example Clause J, the system of Example Clause H or Example Clause I, wherein: the attribute is a first attribute; the target field is a first target field; the data of the network packet comprises a header and a payload; and the configuration file further identifies an identifier of a second target field of the network packet, the system further comprising computer-readable instructions that when executed by the processing system, cause the system to perform operations comprising: extracting, by the network interface card, a value of the second target field from the payload in accordance with the target protocol and the identifier of the second target field identified by the configuration file wherein the value of the first target field is extracted from the header; matching the value of the first target field and the value of the second target field to the entry of the identification table to derive an identification of the first attribute and a second attribute of the network flow; and returning the identification of the first attribute and the second attribute derived from the entry of the identification table.

Example Clause K, the system of any one of Example Clause H through J, wherein: the value of the target field comprises a first volume of data; the entry of the identification table is a value comprising a second volume of data that is less than the first volume of data; and matching the value of the target field to the entry of the identification table reduces a volume of data that is returned by the network interface card thereby reducing a memory consumption associated with identifying the attribute of the network flow.

Example Clause L, the system of any one of Example Clause H through K, wherein: the value of the target field is a domain name; the identification of the attribute is an application name; and matching the value of the target field to the entry of the identification table comprises matching the domain name to derive the application name.

Example Clause M, any one of Example Clause H through K, wherein: the value of the target field is a hexadecimal pattern within a payload of the network packet; the identification of the attribute is a malicious signature; and matching the value of the target field to the entry of the identification table comprises matching the hexadecimal pattern within the payload to derive the malicious signature that corresponds to the hexadecimal pattern.

Example Clause N, any one of Example Clause H through M, wherein matching the value of the target field to the entry of the identification table to derive the identification of the attribute of the network flow comprises matching the value of the target field to one of a plurality of entries associated with the identification of the attribute.

Example Clause O, a computer-readable storage medium having encoded thereon computer-readable instructions that when executed by a system, cause the system to perform operations comprising: receiving, by a network interface card, a configuration file identifying a target protocol and an identifier of a target field of a network packet of a network flow wherein the configuration file configures the network interface card to identify attributes of the network flow; receiving, by the network interface card, the network packet of the network flow, the network packet containing data defining characteristics of the network flow; extracting, by the network interface card, a value of the target field from the data of the network packet in accordance with the target protocol and the identifier of the target field identified by the configuration file; matching the value of the target field to an entry of an identification table defined by the configuration file to derive an identification of the attributes of the network flow; and returning the identification of the attribute derived from the entry of the identification table.

Example Clause P, the computer-readable storage medium of Example Clause O, wherein: the identification of attributes comprises inspecting a plurality of network packets of the network flow; and the configuration file further identifies a number of network packets of the network flow to inspect for the target protocol.

Example Clause Q, the computer-readable storage medium of Example Clause O or Example Clause P, wherein: the attribute is a first attribute; the target field is a first target field; the data of the network packet comprises a header and a payload; and the configuration file further identifies an identifier of a second target field of the network packet, the computer-readable storage medium further comprising computer-readable instructions that when executed by a system, cause the system to perform operations comprising: extracting, by the network interface card, a value of the second target field from the payload in accordance with the target protocol and the identifier of the second target field identified by the configuration file wherein the value of the first target field is extracted from the header; matching the value of the first target field and the value of the second target field to the entry of the identification table to derive an identification of the first attribute and a second attribute of the network flow; and returning the identification of the first attribute and the second attribute derived from the entry of the identification table.

Example Clause R, the computer-readable storage medium of any one of Example Clause O through Q., wherein: the value of the target field comprises a first volume of data; the entry of the identification table is a value comprising a second volume of data that is less than the first volume of data; and matching the value of the target field to the entry of the identification table reduces a volume of data that is returned by the network interface card thereby reducing memory consumption associated with identifying the attribute of the network flow.

Example Clause S, the computer-readable storage medium of any one of Example Clause O through R, wherein: the value of the target field is a domain name; the identification of the attribute is an application name; and matching the value of the target field to the entry of the identification table comprises matching the domain name to derive the application name.

Example Clause T, the computer-readable storage medium of any one of Example Clause O through S, wherein matching the value of the target field to the entry of the identification table to derive the identification of the attribute of the network flow comprises matching the value of the target field to one of a plurality of entries associated with the identification of the attribute.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different network packets).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for offloading identification of an attribute of a network flow to a network interface card configured to process network traffic in a distributed computing environment, the method comprising:

receiving, by the network interface card, a configuration file identifying a target protocol and an identifier of a target field of a network packet of the network flow wherein the configuration file configures the network interface card to identify the attribute of the network flow;

receiving, by the network interface card, the network flow containing the network packet, the network packet containing data defining characteristics of the network flow;

extracting, by the network interface card, a value of the target field from the data of the network packet in accordance with the target protocol and the identifier of the target field identified by the configuration file;

matching, by the network interface card, the value of the target field to an entry of an identification table defined by the configuration file to derive an identification of the attribute of the network flow, wherein the identification table defined by the configuration file is operable to match field values for target protocols to attribute identifiers;

returning, by the network interface card, the identification of the attribute derived from the entry of the identification table; and executing an action on the network flow based on the identification of the attribute.

2. The method of claim 1, wherein:

the identification of attributes comprises inspecting a plurality of network packets of the network flow; and the configuration file further identifies a number of network packets of the network flow to inspect for the target protocol.

3. The method of claim 1, wherein:
the attribute is a first attribute;
the target field is a first target field; and
the network packet is a first network packet;
the configuration file further identifies an identifier of a second target field of the network flow, the method further comprising:
extracting, by the network interface card, a value of the second target field from a second network packet in accordance with the target protocol and the identifier of the second target field identified by the configuration file wherein the value of the first target field is extracted from the first network packet;
matching the value of the first target field and the value of the second target field to the entry of the identification table to derive an identification of the first attribute and a second attribute of the network flow; and
returning the identification of the first attribute and the second attribute derived from the entry of the identification table.

4. The method of claim 1, wherein:
the value of the target field comprises a first volume of data;
the identification of the attribute derived from matching the value of the target field to the entry of the identification table is a value comprising a second volume of data that is less than the first volume of data; and
returning the value derived from matching the value of the target field to the entry of the identification table reduces a memory consumption associated with returning the identification of the attribute of the network flow.

5. The method of claim 1, wherein:
the value of the target field is a domain name;
the identification of the attribute is an application name; and
matching the value of the target field to the entry of the identification table comprises matching the domain name to derive the application name.

6. The method of claim 1, wherein:
the value of the target field is a hexadecimal pattern within a payload of the network packet;
the identification of the attribute is a malicious signature; and
matching the value of the target field to the entry of the identification table comprises matching the hexadecimal pattern within the payload to derive the malicious signature that corresponds to the hexadecimal pattern.

7. The method of claim 1, wherein matching the value of the target field to the entry of the identification table to derive the identification of the attribute of the network flow comprises matching the value of the target field to one of a plurality of entries associated with the identification of the attribute.

8. A system for offloading identification of attributes of a network flow to a network interface card configured to process network traffic in a distributed computing environment, the system comprising:
a processing system; and
a computer-readable medium having encoded thereon computer-readable instructions that when executed by the processing system, cause the system to perform operations comprising:
receiving, by the network interface card, a configuration file identifying a target protocol and an identifier of a target field of a network packet of the network flow wherein the configuration file configures the network interface card to identify the attributes of the network flow;
receiving, by the network interface card, the network flow containing the network packet, the network packet containing data defining characteristics of the network flow;
extracting, by the network interface card, a value of the target field from the data of the network packet in accordance with the target protocol and the identifier of the target field identified by the configuration file;
matching the value of the target field to an entry of an identification table defined by the configuration file to derive an identification of the attribute of the network flow, wherein the identification table defined by the configuration file is usable to match field values for target protocols to attribute identifiers; and
returning the identification of the attribute derived from the entry of the identification table.

9. The system of claim 8, wherein:
the identification of attributes comprises inspecting a plurality of network packets of the network flow; and
the configuration file further identifies a number of network packets of the network flow to inspect for the target protocol.

10. The system of claim 8, wherein:
the attribute is a first attribute;
the target field is a first target field;
the data of the network packet comprises a header and a payload; and
the configuration file further identifies an identifier of a second target field of the network packet, the system further comprising computer-readable instructions that when executed by the processing system, cause the system to perform operations comprising:
extracting, by the network interface card, a value of the second target field from the payload in accordance with the target protocol and the identifier of the second target field identified by the configuration file wherein the value of the first target field is extracted from the header;
matching the value of the first target field and the value of the second target field to the entry of the identification table to derive an identification of the first attribute and a second attribute of the network flow; and
returning the identification of the first attribute and the second attribute derived from the entry of the identification table.

11. The system of claim 8, wherein:
the value of the target field comprises a first volume of data;
the entry of the identification table is a value comprising a second volume of data that is less than the first volume of data; and
matching the value of the target field to the entry of the identification table reduces a volume of data that is returned by the network interface card thereby reducing a memory consumption associated with identifying the attribute of the network flow.

12. The system of claim 8, wherein:
the value of the target field is a domain name;
the identification of the attribute is an application name; and matching the value of the target field to the entry of the identification table comprises matching the domain name to derive the application name.

13. The system of claim 8, wherein:

the value of the target field is a hexadecimal pattern within a payload of the network packet;

the identification of the attribute is a malicious signature; and matching the value of the target field to the entry of the identification table comprises matching the hexadecimal pattern within the payload to derive the malicious signature that corresponds to the hexadecimal pattern.

14. The system of claim 8, wherein matching the value of the target field to the entry of the identification table to derive the identification of the attribute of the network flow comprises matching the value of the target field to one of a plurality of entries associated with the identification of the attribute.

15. A computer-readable storage medium having encoded thereon computer-readable instructions that when executed by a system, cause the system to perform operations comprising:

receiving, by a network interface card, a configuration file identifying a target protocol and an identifier of a target field of a network packet of a network flow wherein the configuration file configures the network interface card to identify attributes of the network flow;

receiving, by the network interface card, the network packet of the network flow, the network packet containing data defining characteristics of the network flow;

extracting, by the network interface card, a value of the target field from the data of the network packet in accordance with the target protocol and the identifier of the target field identified by the configuration file;

matching the value of the target field to an entry of an identification table defined by the configuration file to derive an identification of the attributes of the network flow, wherein the identification table defined by the configuration file matches field values for target protocols to attribute identifiers; and returning the identification of the attribute derived from the entry of the identification table.

16. The computer-readable storage medium of claim 15, wherein:

the identification of attributes comprises inspecting a plurality of network packets of the network flow; and the configuration file further identifies a number of network packets of the network flow to inspect for the target protocol.

17. The computer-readable storage medium of claim 15, wherein:

the attribute is a first attribute;

the target field is a first target field;

the data of the network packet comprises a header and a payload; and the configuration file further identifies an identifier of a second target field of the network packet, the computer-readable storage medium further comprising computer-readable instructions that when executed by a system, cause the system to perform operations comprising:

extracting, by the network interface card, a value of the second target field from the payload in accordance with the target protocol and the identifier of the second target field identified by the configuration file wherein the value of the first target field is extracted from the header;

matching the value of the first target field and the value of the second target field to the entry of the identification table to derive an identification of the first attribute and a second attribute of the network flow; and returning the identification of the first attribute and the second attribute derived from the entry of the identification table.

18. The computer-readable storage medium of claim 15, wherein:

the value of the target field comprises a first volume of data;

the entry of the identification table is a value comprising a second volume of data that is less than the first volume of data; and matching the value of the target field to the entry of the identification table reduces a volume of data that is returned by the network interface card thereby reducing memory consumption associated with identifying the attribute of the network flow.

19. The computer-readable storage medium of claim 15, wherein:

the value of the target field is a domain name;

the identification of the attribute is an application name; and matching the value of the target field to the entry of the identification table comprises matching the domain name to derive the application name.

20. The computer-readable storage medium of claim 15, wherein matching the value of the target field to the entry of the identification table to derive the identification of the attribute of the network flow comprises matching the value of the target field to one of a plurality of entries associated with the identification of the attribute.

* * * * *